(12) United States Patent
Judd et al.

(10) Patent No.: US 11,741,992 B2
(45) Date of Patent: *Aug. 29, 2023

(54) MANAGEMENT OF HEAD AND MEDIA DIMENSIONAL STABILITY

(71) Applicant: International Business Machines Corporation, Armonk, NY (US)

(72) Inventors: Kevin B. Judd, Tucson, AZ (US); Randy C. Inch, Tucson, AZ (US); Eiji Ogura, Yokohama (JP); Ernest S. Gale, Tucson, AZ (US); Pamela R. Nylander-Hill, Tucson, AZ (US); Dale A. Christiansen, Tucson, AZ (US); Paul M. Greco, Tucson, AZ (US); Kevin D. Butt, Tucson, AZ (US); Steven M. Wallace, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 520 days.

This patent is subject to a terminal disclaimer.

(21) Appl. No.: 16/528,458

(22) Filed: Jul. 31, 2019

(65) Prior Publication Data

US 2020/0143830 A1    May 7, 2020

Related U.S. Application Data

(63) Continuation of application No. 16/181,210, filed on Nov. 5, 2018, now Pat. No. 10,460,757.

(51) Int. Cl.
*G11B 5/596* (2006.01)
*G11B 15/18* (2006.01)
*G11B 5/008* (2006.01)

(52) U.S. Cl.
CPC .......... *G11B 15/18* (2013.01); *G11B 5/00813* (2013.01)

(58) Field of Classification Search
CPC .......... G11B 15/18; G11B 15/46; G11B 5/58; G11B 5/59633; G11B 5/59655; G11B 5/584; G11B 5/5513
(Continued)

(56) References Cited

U.S. PATENT DOCUMENTS 6,992,857 B2   1/2006   Knowles et al.
7,158,339 B2   1/2007   Kuse et al.
(Continued)

FOREIGN PATENT DOCUMENTS

EP            616319 A2    9/1994

OTHER PUBLICATIONS

Judd et al., U.S. Appl. No. 16/528,475, filed Jul. 31, 2019.
(Continued)

*Primary Examiner* — Nabil Z Hindi
(74) *Attorney, Agent, or Firm* — Zilka-Kotab, P.C.

(57) ABSTRACT

A method for characterizing a magnetic recording tape, according to one approach, includes measuring, using a magnetic head having servo readers of known pitch, a servo band difference at various locations along a length of a magnetic recording tape. The servo band difference measurements and/or derivatives thereof are stored in association with the magnetic recording tape. This procedure creates a characterization of the magnetic recording tape that is useful for assessing aging of the magnetic recording tape, as well as improving subsequent reading and/or writing operations.

25 Claims, 14 Drawing Sheets

(58) Field of Classification Search
USPC ......... 360/73.04, 74.03, 77.01, 77.05, 77.12, 360/78.02
See application file for complete search history.

(56) References Cited

U.S. PATENT DOCUMENTS

| | | | |
|---|---|---|---|
| 7,391,587 | B2 | 6/2008 | Dugas et al. |
| 7,411,759 | B2 | 8/2008 | Trabert et al. |
| 7,929,243 | B2 * | 4/2011 | Bui .................. G11B 5/00813 360/77.12 |
| 8,139,312 | B2 | 3/2012 | Bui et al. |
| 8,264,789 | B2 | 9/2012 | Kawakami et al. |
| 8,526,135 | B2 | 9/2013 | Ohtsu et al. |
| 8,711,501 | B2 | 4/2014 | Childers et al. |
| 9,153,279 | B1 | 10/2015 | Hikita |
| 9,361,921 | B2 | 6/2016 | Herget |
| 10,460,757 | B1 | 10/2019 | Judd et al. |
| 10,566,022 | B1 | 2/2020 | Judd et al. |
| 10,832,722 | B2 | 11/2020 | Judd et al. |
| 2004/0174132 | A1 * | 9/2004 | Johnson ................. G11B 5/584 318/652 |
| 2005/0248869 | A1 | 11/2005 | Bartlett |
| 2006/0285240 | A1 | 12/2006 | Jurneke |
| 2011/0122522 | A1 | 5/2011 | Itagaki et al. |
| 2012/0050910 | A1 | 3/2012 | Ohtsu et al. |
| 2016/0179417 | A1 | 6/2016 | Fasen et al. |
| 2020/0143831 | A1 | 5/2020 | Judd et al. |

OTHER PUBLICATIONS

List of IBM Patents Or Patent Applications Treated As Related.
Notice of Allowance from U.S. Appl. No. 16/528,475, dated Sep. 27, 2019.
Judd et al., U.S. Appl. No. 16/181,210, filed Nov. 5, 2018.
Notice of Allowance from U.S. Appl. No. 16/181,210, dated Jun. 10, 2019.
Judd et al., U.S. Appl. No. 16/661,929, filed Oct. 23, 2019.
Non-Final Office Action from U.S. Appl. No. 16/528,475, dated Sep. 11, 2019.
Non-Final Office Action from U.S. Appl. No. 16/661,929, dated Apr. 8, 2020.
Notice of Allowance from U.S. Appl. No. 16/661,929, dated Aug. 5, 2020.

* cited by examiner

Writing Condition    Reading Condition after Tape Expansion

FIG. 10

Uncorrectable Errors By Track
(Higher Values Indicate More Errors)

Higher Error Rates Toward Edge Tracks

FIG. 11

MANAGEMENT OF HEAD AND MEDIA DIMENSIONAL STABILITY

BACKGROUND

The present invention relates to data storage systems, and more particularly, this invention relates to managing dimensional stability issues.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

Tape drives write and read multiple data tracks simultaneously. It is critical that all data tracks are written in the correct locations for proper operation during subsequent readback. If the dimension of the head changes due to temperature or other causes, or if the transducers on the head are not positioned in the proper, design-specified locations due to fabrication variations, then data tracks will be written/read at incorrect locations. Likewise, if the media is not consistent in its dimensions, then the data tracks will move after writing and not be in the same location when the tape is read. In either case, successful read back of the data will be impaired.

In the past, the management of dimensional stability issues was done by tolerance control. Each component had limits on how much variation from design parameters was allowed. As track density increased, the allowable limits for variation were also decreased. However, to continue to increase track density to support high tape cartridge capacities, this method is no longer feasible, as components cannot be made at lower variation. Accordingly, the capacity growth of future tape storage schemes will be limited if new techniques for managing head and media dimensional stability are not developed.

SUMMARY

A method for characterizing a magnetic recording tape includes measuring, using a magnetic head having servo readers of known pitch, a servo band difference at various locations along a length of a magnetic recording tape. The servo band difference measurements and/or derivatives thereof are stored in association with the magnetic recording tape. This procedure creates a characterization of the magnetic recording tape that is useful for assessing aging of the magnetic recording tape, as well as improving subsequent reading and/or writing operations.

In one approach, the servo band difference measurements are taken at the various locations along about an entire length of the magnetic recording tape. This provides a characteristic of most or all of the magnetic recording tape.

Preferably, the servo band difference measurements and/or derivatives thereof are stored on the magnetic recording tape and/or a tape cartridge thereof. The servo band difference measurements and/or derivatives thereof, referred to herein collectively as "servo band information," thus remains with the magnetic recording tape and is readily available when needed.

The servo band difference measurements and/or derivatives thereof are preferably compensated using the known pitch, which may be particular to a tape drive having the magnetic head. This compensation causes the servo band information to more accurately reflect the actual media spacing characteristics.

A method for controlling writing to a magnetic recording tape includes retrieving servo band difference information about the magnetic recording tape. A servo band difference is measured at various locations along a length of the magnetic recording tape using servo readers of a magnetic head. The servo band difference measurements and/or derivatives thereof are compared to the retrieved servo band difference information, and a writing operation is controlled based at least in part on a result of the comparing. As tape and head dimensional changes affect the location of written tracks, it is critical that the current writing operation does not excessively trim, or narrow, the previously written data tracks, thereby rendering the data tracks unreadable. The foregoing procedure, among other things, may be used to prevent overwriting of the previously-written tracks during shingling.

In one approach, the writing operation is suspended in response to a result of the comparing being indicative of potential off-track writing.

In another approach, an operating condition is adjusted in response to the comparing for reducing occurrence of off-track writing.

The servo band difference measurements and/or derivatives thereof captured during writing may be stored on the magnetic recording tape and/or a tape cartridge thereof for use when reading back the data. This information may be used to improve reading, for example, when used in the following method.

A method for controlling reading of a magnetic recording tape includes retrieving servo band difference information about a magnetic recording tape. A servo band difference at various locations along a length of the magnetic recording tape is measured using servo readers of a magnetic head. The servo band difference measurements and/or derivatives thereof are compared to the retrieved servo band difference information. A reading operation s controlled based at least in part on a result of the comparing. For example, this procedure may improve reading performance, e.g., by assisting in centering the reader transducers (also referred to herein as readers) as much as possible above the appropriate data track.

An operating condition may be adjusted in response to the comparing for reducing occurrence of off-track reading. For example, tape tension may be adjusted during the reading to alter track pitch to help align the data tracks with the read transducers.

In another approach, the pitches between read transducers of the magnetic head are adjusted during the reading. This helps align the read transducers with the data tracks.

In yet another approach, error recovery may be performed in response to a result of the comparing being indicative of off-track reading. This helps ensure the accuracy of the data.

An apparatus includes a drive mechanism for passing the magnetic recording tape over the magnetic head, and a controller electrically coupled to the magnetic head, the controller being configured to perform any of the foregoing the methods.

A computer program product includes a computer readable storage medium having program instructions embodied therewith, wherein the computer readable storage medium is not a transitory signal per se, the program instructions executable by a tape drive having the magnetic head to cause the tape drive to perform any of the foregoing the methods.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 10 is a representational diagram of the effect of tape lateral expansion and consequential transducer misregistration.

FIG. 11 is a chart exemplifying the increase in error rate toward outer ends of a reader array due to a misregistration of the readers toward the outer ends of the array.

DETAILED DESCRIPTION

Figure 1A:
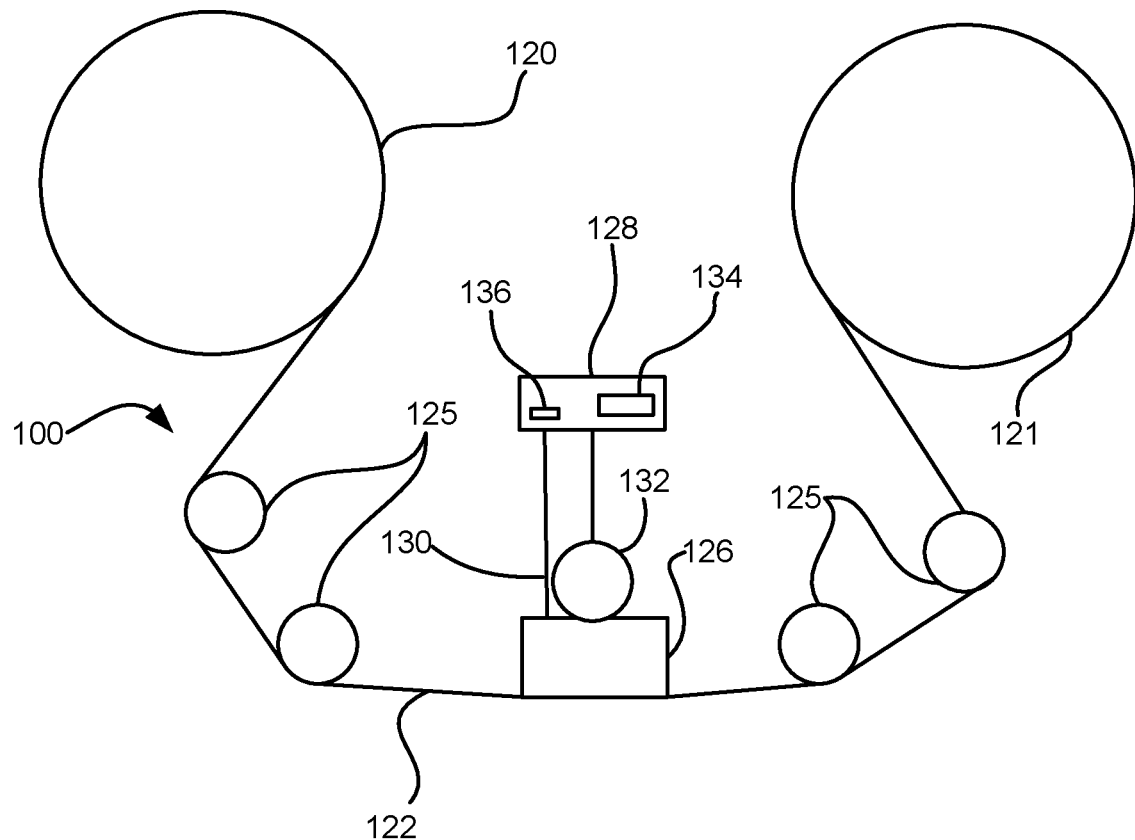
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

A method for characterizing a magnetic recording tape of a tape cartridge, according to one approach, includes measuring, using a magnetic head having servo readers of known pitch, a servo band difference at various locations along a length of a magnetic recording tape of a tape cartridge. The servo band difference measurements and/or derivatives thereof are stored in association with the tape cartridge. This procedure creates a characterization of the magnetic recording tape that is useful for assessing aging of the magnetic recording tape, as well as improving subsequent reading and writing operations.

A method for controlling writing to a magnetic recording tape of a tape cartridge, according to another approach, includes retrieving servo band difference information from a tape cartridge. A servo band difference is measured at various locations along a length of a magnetic recording tape of the tape cartridge using servo readers of a magnetic head. The servo band difference measurements and/or derivatives thereof are compared to the retrieved servo band difference information, and a writing operation is controlled based at least in part on a result of the comparing. As tape and head dimensional changes affect the location of written tracks, it is critical that the current writing operation does not excessively trim, or narrow, the previously written data tracks, thereby rendering the data tracks unreadable. The foregoing procedure, among other things, may be used to prevent overwriting of the previously-written tracks during shingling.

A method for controlling reading of a magnetic recording tape of a tape cartridge, according to yet another approach, includes retrieving servo band difference information about a tape cartridge. A servo band difference at various locations along a length of a magnetic recording tape of the tape cartridge is measured using servo readers of a magnetic head. The servo band difference measurements and/or derivatives thereof are compared to the retrieved servo band difference information. A reading operation s controlled based at least in part on a result of the comparing. For example, this procedure may improve reading performance, e.g., by assisting in centering the reader transducers (also referred to herein as readers) as much as possible above the appropriate data track.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
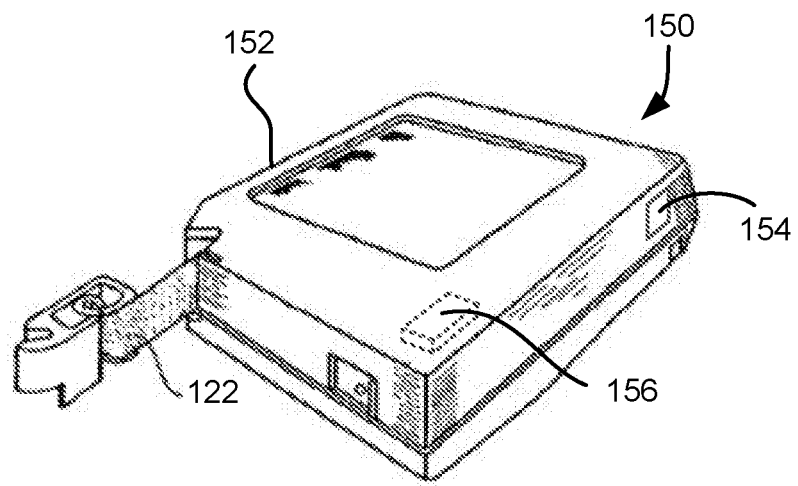
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
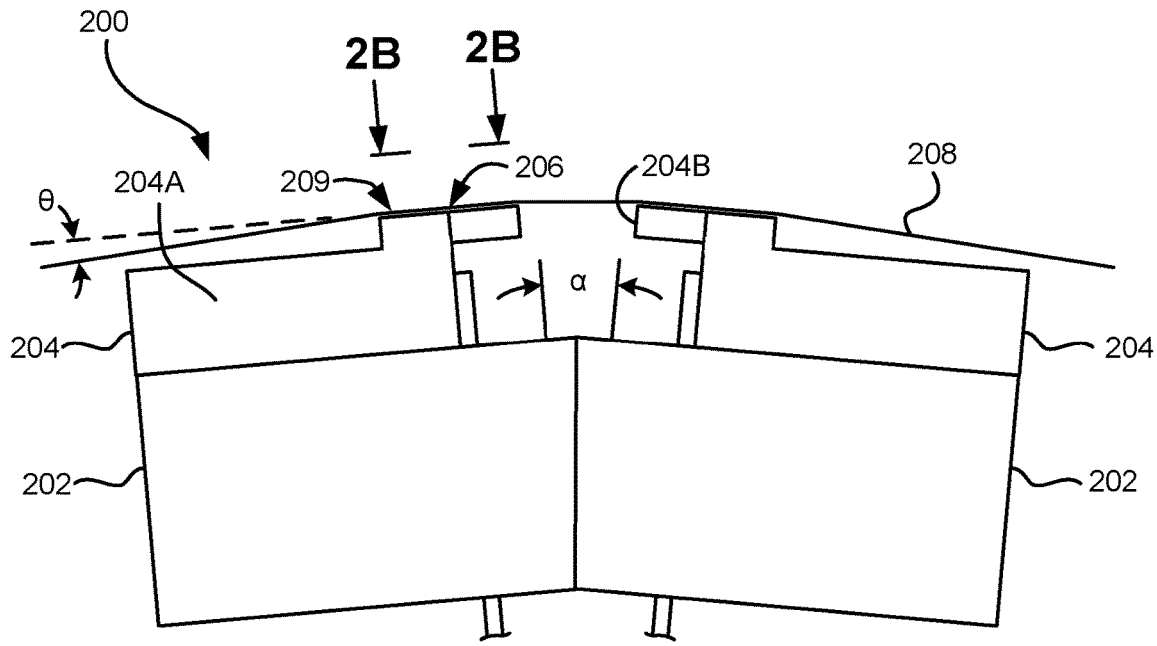
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
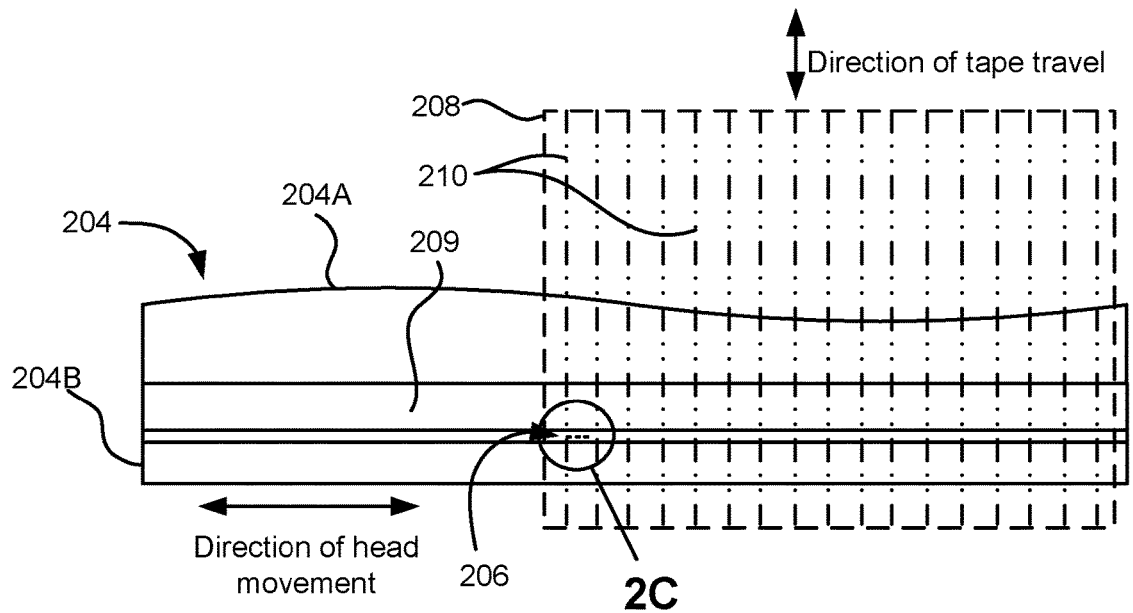
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
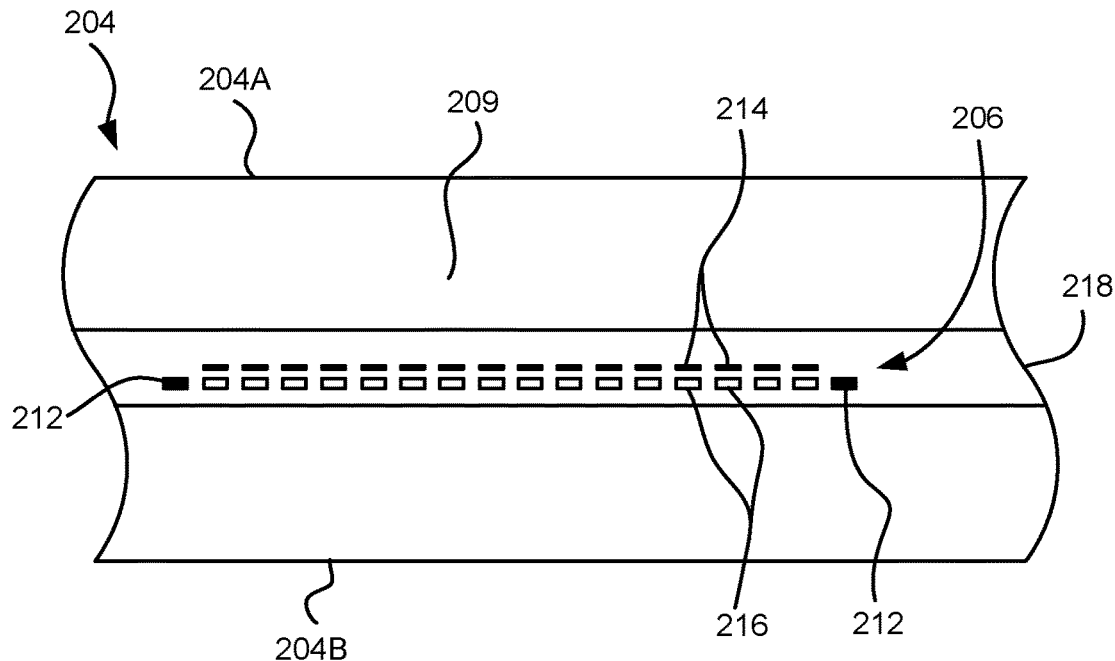
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary.

Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
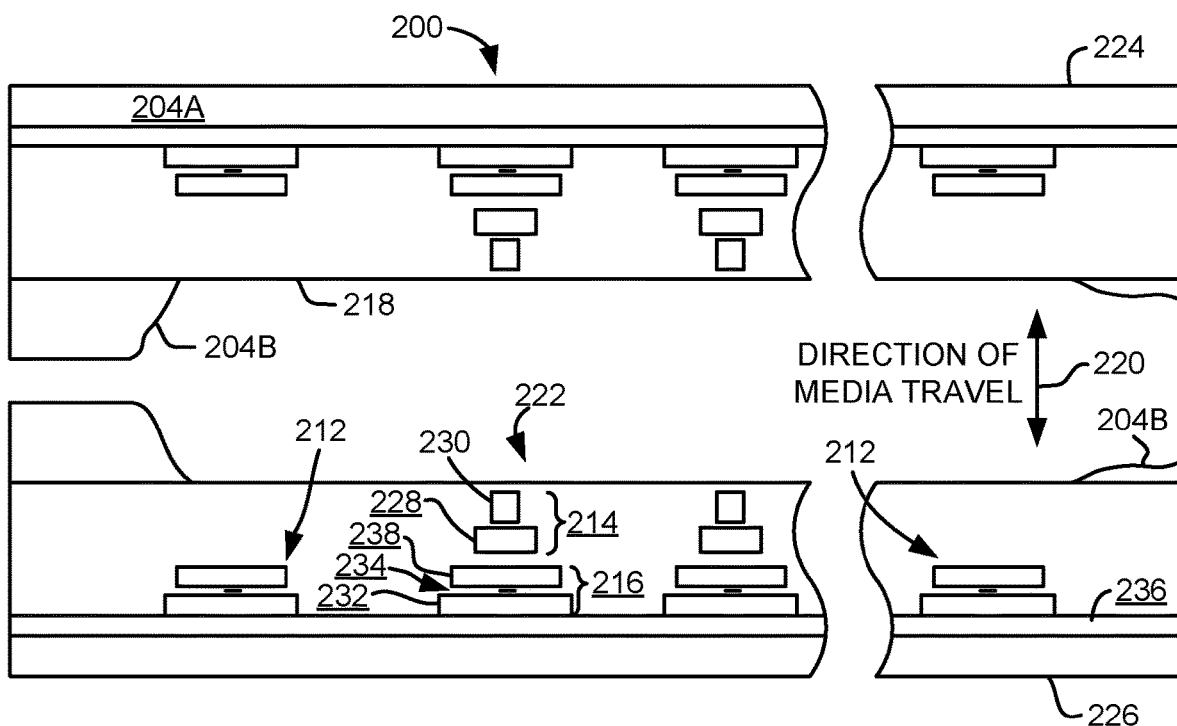
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
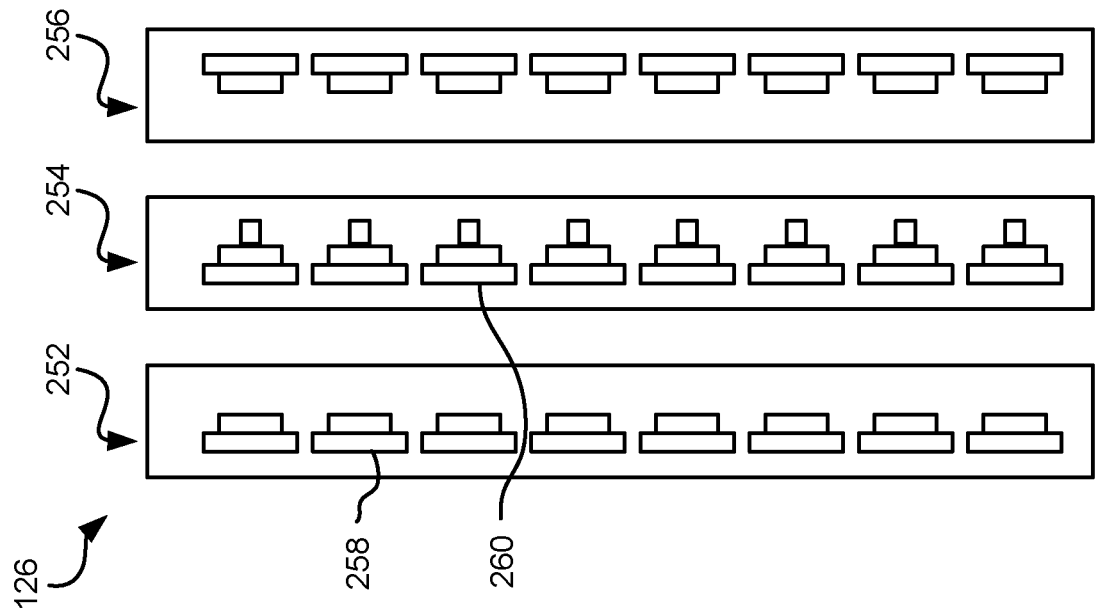
FIG. 4 is a partial tape bearing surface view of a magnetic head having a read-write-read configuration.
Figure 3:
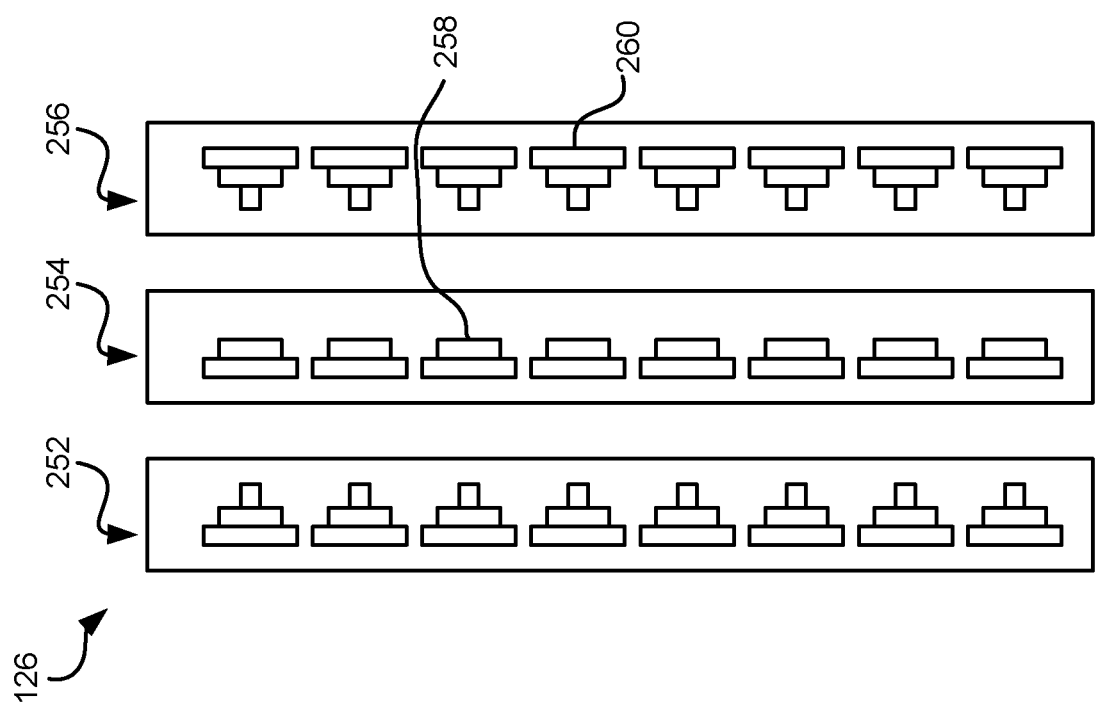
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
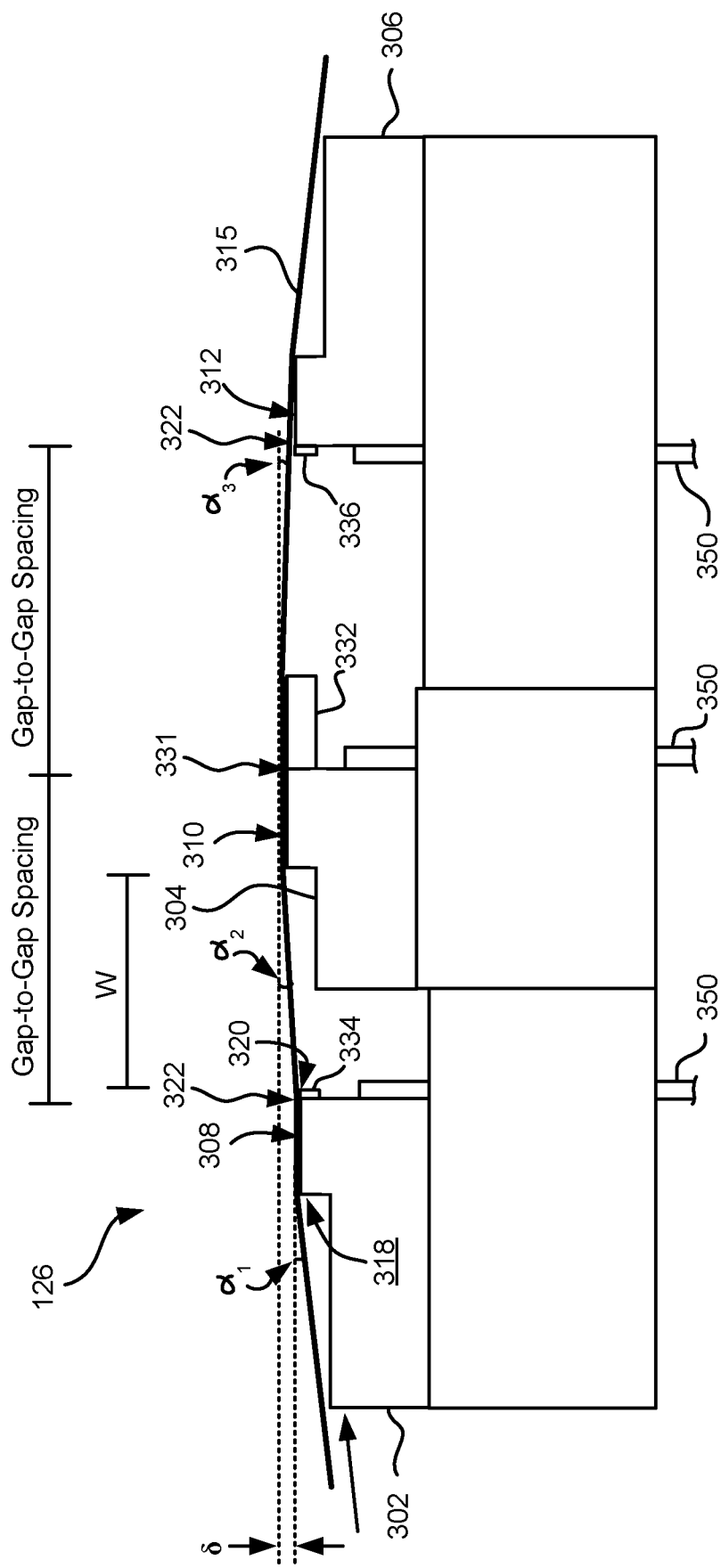
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
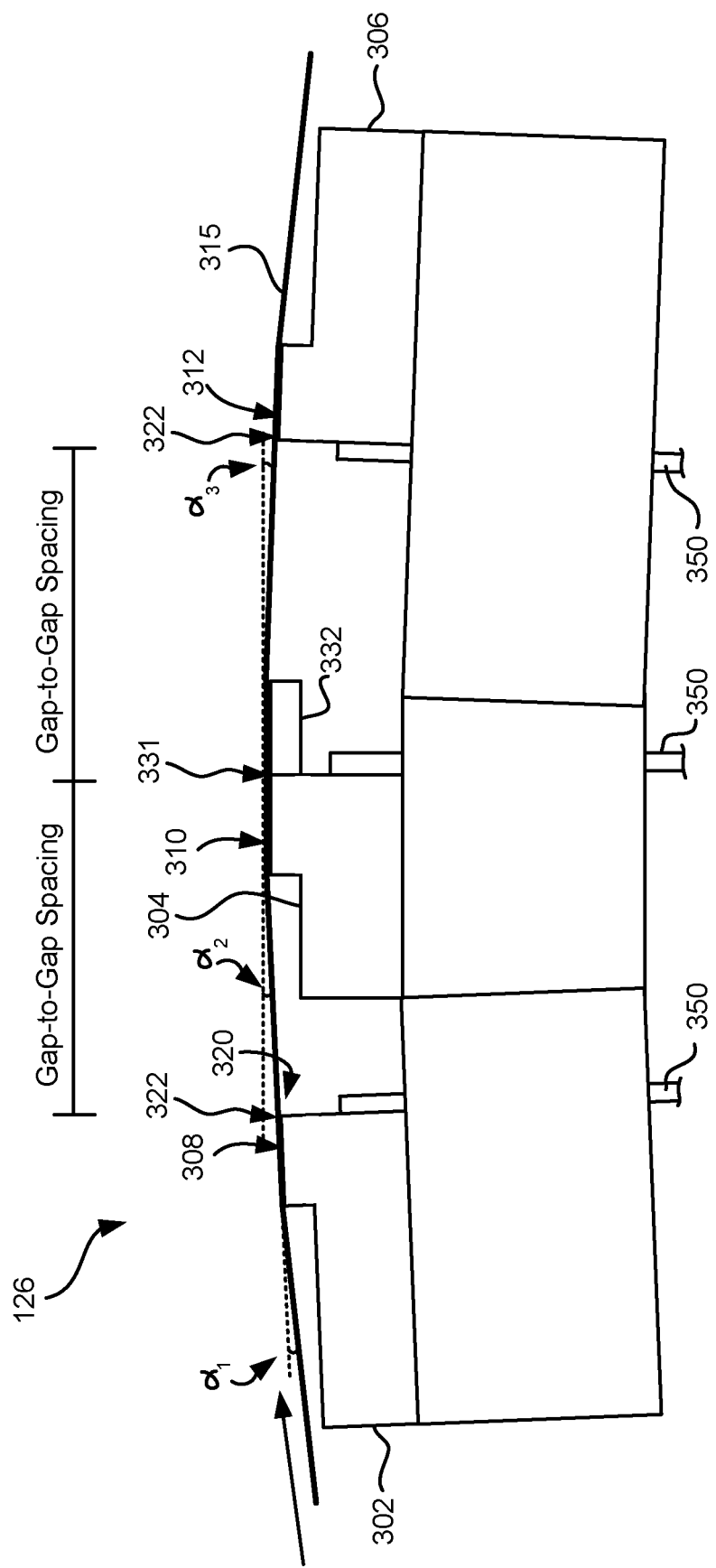
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
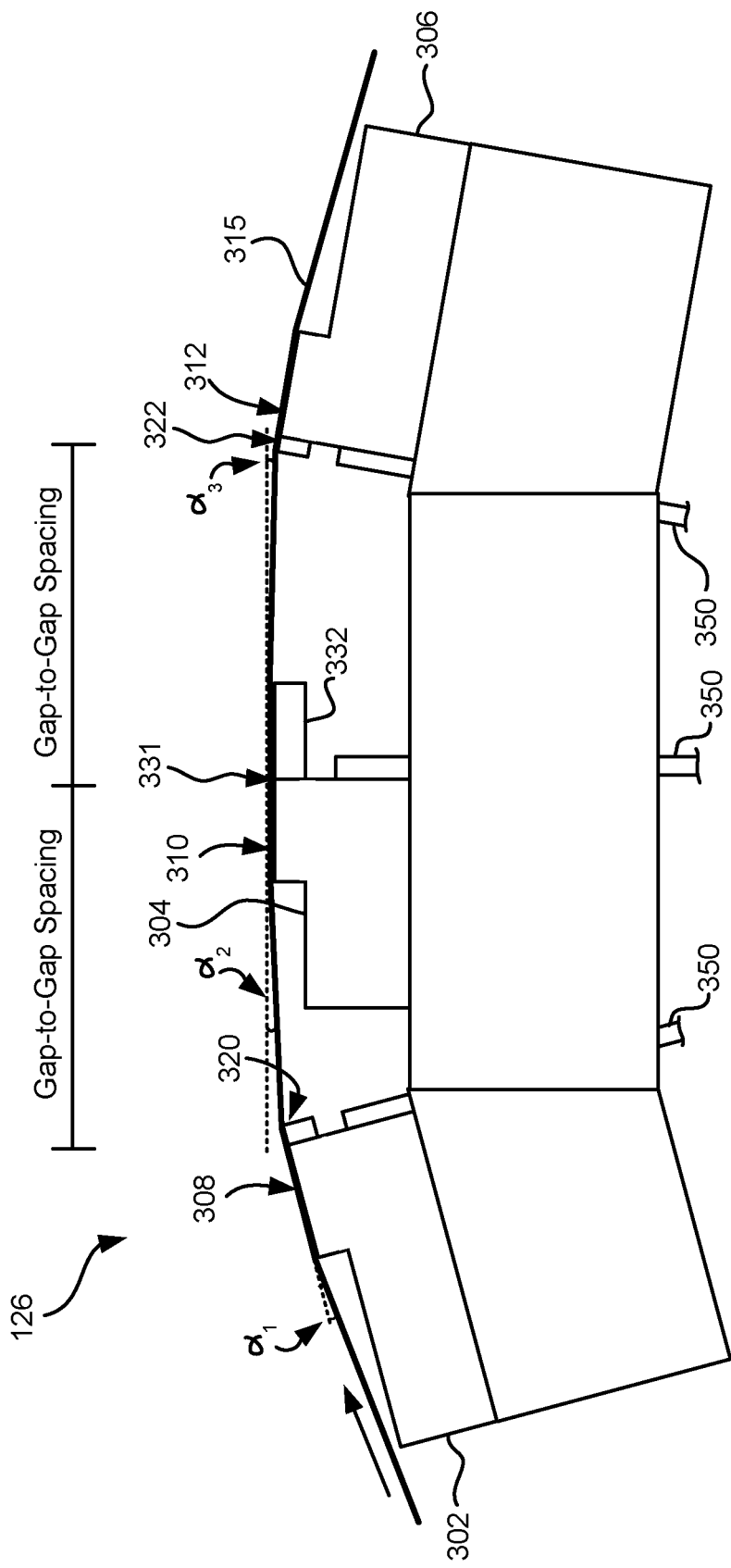
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
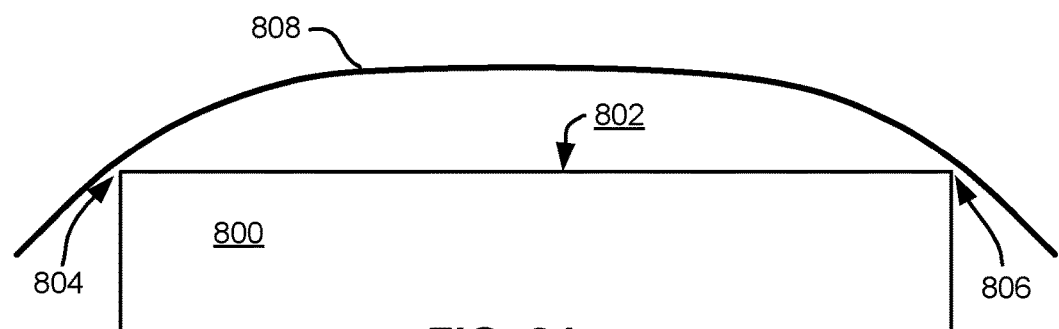
FIGS. 8A-8C are schematics depicting the principles of tape tenting.
Figure 8B:
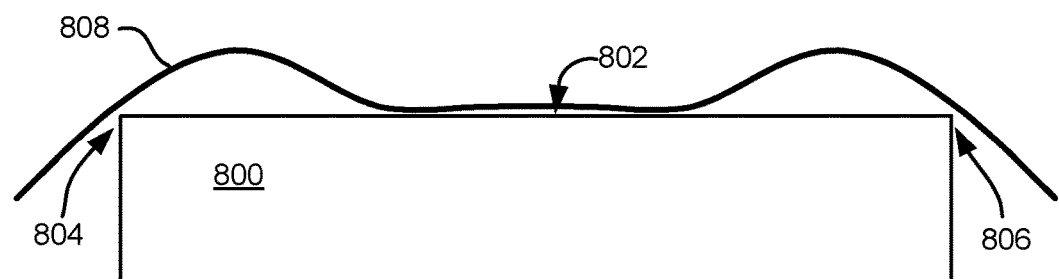
Figure 8C:
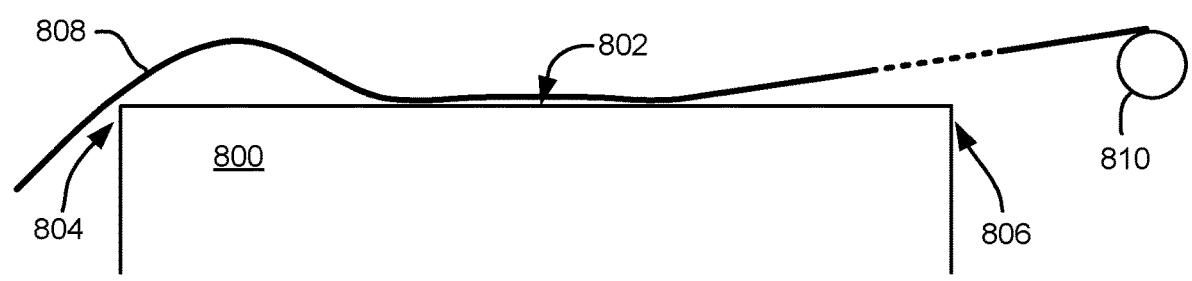

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
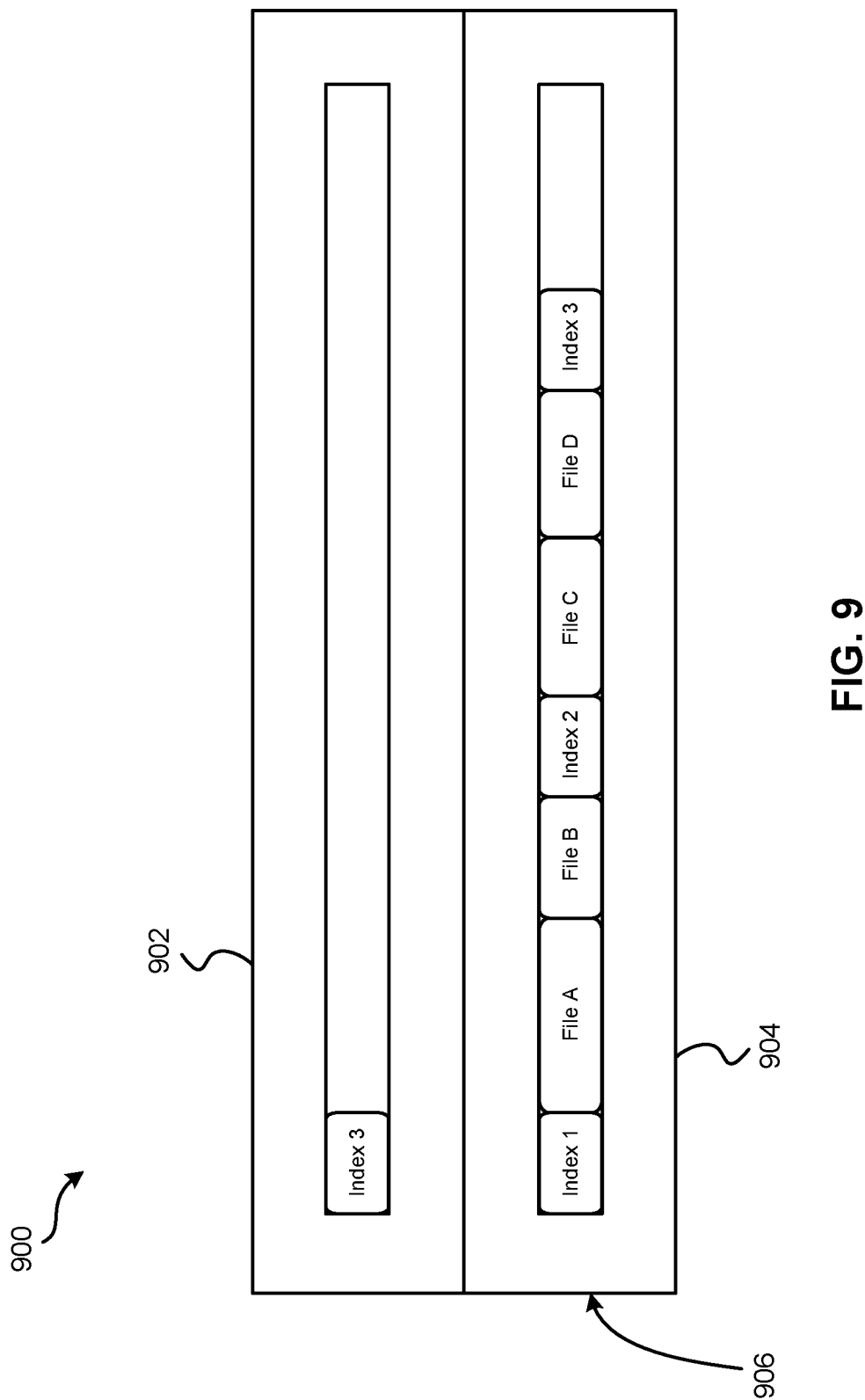
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As track density increases, resolution of dimensional stability issues becomes more important, and tolerance control is reaching the limit of its effectiveness. Particularly, there is a limit to the precision at which components can be fabricated. As dimensions of components become smaller and smaller, that limit will be reached.

As mentioned above, in tape storage, the magnetic head dimensions are not only different from drive to drive, but each head may also change over time due to factors such as thermal expansion, relaxation of stresses within the head, etc. Moreover, tape lateral contraction and expansion is a well-known phenomenon that occurs due to a plethora of effects, including absorption of water, thermal expansion and contraction, etc.

More permanent changes in media lateral dimensions may also occur, such as long-term media creep (also known in the art as "aging"), which tends to occur over time when a tape is wound around a hub of a tape cartridge. Long-term media creep is particularly problematic when dealing with tape dimensional stability issues, as the two ends of the tape exhibit creep in different ways. The inner wraps of tape positioned closest to the cartridge hub tend to expand laterally over time due to the compressive stresses exerted thereon by the wraps of tape wound around them. Wraps positioned toward the outer diameter of the spool of tape are under less compressive stress, but are under higher tensile stresses, which tends to cause lateral contraction of the tape, i.e., the tape becomes narrower over time. Accordingly, the ends of the tape exhibit oppositely-oriented lateral dimensional changes.

When the dimensions of the tape, the head, or both change, various issues arise. During writing, the likelihood of overwriting shingled tracks increases. Overwritten data is often unrecoverable. Likewise, during readback, if readers are no longer over the tracks to be read, reading errors increase.

FIG. 10 depicts the effect of a change in dimension of a head and/or tape after writing has occurred. For simplicity, five data tracks are shown, labeled Data Track 1 through Data Track 5. As shown, the data tracks are written at a certain spacing, referred to as the writing condition. However, sometime after writing, the tape has expanded due to factors such as temperature, humidity, creep, etc. Assume the readers have the same spacing (pitch) as the writers that wrote the data tracks. The track following system centers the middle reader on the middle track, but the outer readers are then partially off-track due to the expanded condition of the tape. Accordingly, not only are the outer readers less influenced by the magnetic transitions of the outer data tracks, but shingled tracks adjacent the intended tracks influence the readers, creating noise. Thus, the misregistration results in a higher amount of read errors for tracks positioned toward the ends of the array. FIG. 11 is a chart exemplifying the increase in error rates toward outer ends of a reader array due to a misregistration of the readers toward the outer ends of the array. There is no position that the head may move to that will improve readback.

Similarly, if the magnetic head expands or contracts, or if due to head manufacturing tolerances the writer head and reader head have different spacing, similar misregistration can occur, even if the tape has not changed. Where both the tape and reading head have changed in opposite dimensions, e.g., one is contracted while the other is expanded, the misregistration problem is compounded. Thus, in either case the readback of that data is impaired.

In order to overcome the limitations mentioned above, new techniques to manage the stability of head and/or media are needed. Various techniques and approaches for managing head and media dimensional stability are presented herein.

Referring again to FIGS. 2A-4, typical tape drives have multiple modules, and at least two servo readers on each module. These servo readers and track following module of the controller decode respective servo patterns and assist in positioning the data transducers at the appropriate locations for reading and/or writing. In an ideal situation, the track following module would indicate that both servo readers are reading the same position on their respective servo tracks. However, this is rarely the case, for the many reasons enumerated above.

Fortunately, changes in dimensions of the head, the media, or both can be detected by comparing the difference in the servo reader measurements. This measurement from the servo readers is one method that can be used to determine variations in heads and media, and will be referred to herein as Servo Band Difference (SBD). SBD information may include the SBD measurement itself and/or information derived from the SBD measurements.

Various approaches for managing dimensional stability issues are presented below. In general, the approaches include three individually novel components that together may form one overall general solution. The first component includes characterizing a magnetic recording tape ("tape") of a cartridge, e.g., at initialization of the cartridge, sometime thereafter, and/or as a recharacterization. The second component includes utilizing this information during writing, and may also include recording SBD information during writing e.g., to a data set information table (DSIT). The third component includes utilizing the SBD information and/or DSIT information during reading.

To measure SBD, servo readers on the same module read respective servo patterns on the media. In the ideal case, both servo readers would measure the same position on their relative servo pattern. However, media and heads are rarely ideal, and therefore any deviation from this ideal case can be determined by comparing the position measurements from the two servo channels. If SBD gets larger, this implies that the tape has contracted in the lateral direction and/or that the head has expanded. Likewise, if SBD gets smaller, this implies that the tape has expanded in the lateral direction and/or that the head has contracted.

Figure 12:
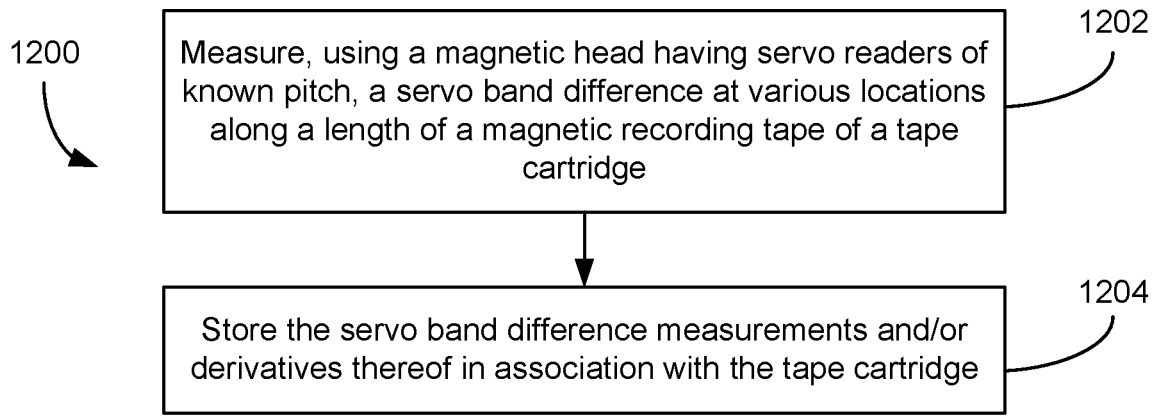
FIG. 12 is a flow chart of a process for characterizing a magnetic recording tape of a tape cartridge.

The SBD measurements may be used to characterize a magnetic recording tape. Referring to FIG. 12, a flowchart of a method 1200 for characterizing a magnetic recording tape of a tape cartridge is shown. The method 1200 may be performed in accordance with the present invention in any of the environments depicted in FIGS. 1-9, among others, in various approaches. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

This process may be performed when a new tape is being prepared for first use. For example, this process may be added to a conventional cartridge initialization process. This process may also be performed when a data band or data bands on a used tape is ready for overwriting.

As shown in FIG. 12, method 1200 may initiate with operation 1202, where SBD measurements are made at various locations along a length of a magnetic recording tape using a magnetic head having servo readers of known pitch. Because the spacing is not generally constant along the length of the tape, the observed SBD measurements are typically different as the tape move from BOT toward EOT. Without wishing to be bound by any theory, it is believed that this change is due at least in part to the pack stresses that are imputed in tape when stored in the cartridge. SBD measurements may be taken for some, and preferably for each of the data bands on the tape. Preferably, the SBD measurements are taken at various locations along about an entire length of the magnetic recording tape, but, in some approaches, only a portion of the length of the tape is characterized. The tape is ideally maintained at about constant tension while measuring the SBD to minimize tension-induced dimensional changes of the tape. The constant tension is preferably similar to the preferred tension for read and/or write operations on the magnetic tape.

In one approach, while holding the tape tension about fixed, the tape drive moves the tape from BOT to EOT while making measurements of SBD. Since the SBD tends to change from BOT to EOT, multiple measurements are preferably made. In general, any granularity of measurement interval can be applied, with higher numbers of SBD measurements providing more information for later use. Preferably, at least 100 SBD measurements are taken between BOT and EOT for each data band, and more preferably at least 200 SBD measurements are taken between BOT and EOT for each data band, though less than 100 measurements may be taken in some approaches.

Note that servo reader pitch varies from head to head, and therefore, the raw SBD measurements do not typically reflect the actual servo track spacing. Said another way, wider or narrower servo pitch on the head than the assumed pitch would cause an error in the measurement of the current media spacing value. Accordingly, during this process, the pitch of the servo readers on the head is preferably known, and used to adjust (compensate) the SBD values so that the SBD values more accurately reflect the actual media spacing characteristics. The pitch of the servo readers corresponds directly to the spacing of the servo readers relative to each other, and may be center-to-center pitch, edge-to-edge pitch, etc.

The pitch of the servo readers may be derived or obtained in any suitable known manner. Typically, this value is stored in the memory of each drive during manufacture thereof. In one approach, the pitch is measured for each drive at manufacturing and placed in a non-volatile area of drive memory such as with the vital product data (VPD). This head calibration can be performed in multiple ways, such as measurement with an atomic force microscope (AFM) using stages, the use of a reference tape having servo tracks of known spacing, or any other method which provides a measurement of transducers relative to other transducers. In another approach, the pitch is measured for a drive after the drive has been built, and optionally in use. In a preferred approach, a reference tape may be used.

By using the pitch value stored in the VPD, when a tape is characterized using process 1200, the measurements observed can be compensated according to the head spacing value stored in VPD, thus ensuring that the measurements taken, and corresponding values ultimately written to the cartridge memory (CM), are representative of the cartridge, and not unduly influenced by the head making the measurement.

Additionally, by using temperature and/or humidity sensors in the drive (or external sensors with information communicated to the drive), the effects of the local temperature and/or humidity can also be compensated for. For example, if the humidity is high, then tape expands and the cartridge is initialized at this high humidity condition. It is desired that the stored SBD values represent a nominal condition in head spacing, temperature, and humidity.

In operation 1204, the SBD measurements and/or derivatives thereof (collectively referred to herein as "SBD information") are stored in association with the tape cartridge. Preferably, the SBD information includes a position along the tape where each SBD measurement was taken, in association with the corresponding SBD measurement. For example, Linear Tape Open (LTO) linear positioning (LPOS) information may be stored in association with each SBD measurement. Accordingly, a representation of the media spacing characteristics at the time of performing method 1200 is stored for later use.

Any of a plurality of storage techniques may be used to store SBD information, such as storage of raw points; fitting of the measurements to a function (linear, polynomial, spline, etc.) and then storing the coefficients or describing variables; etc. The SBD information can be stored in any suitable location where it can be referenced at a later time. The SBD information is preferably written to the CM of the cartridge. Other locations for storage of the SBD information include on the tape itself, e.g., in the header information; on a removable storage device of the cartridge, e.g., an SD card; in a database of information about tape cartridges, e.g., in a library database; in cloud-based storage; etc.

The method 1200 may be performed as part of a cartridge initialization procedure. For example, in addition to performing conventional special operations during the first load of a brand-new cartridge, the operations of method 1200 may be performed during the cartridge initialization process.

The method 1200 may also be invoked at times other than the first load. For example, the timing for performing method 1200 may correspond to other operations, such as changing the format of the tape, after a garbage collection process renders all data on the tape deleted, etc. Characterizing or recharacterizing the tape at times other than the first load may be useful to reset the SBD information to account for any creep that has occurred in the media since the previous initialization. Other operations, such as those that are completely destructive, such as the format command, may be considered as appropriate times to reissue the cartridge initialization.

Figure 13:
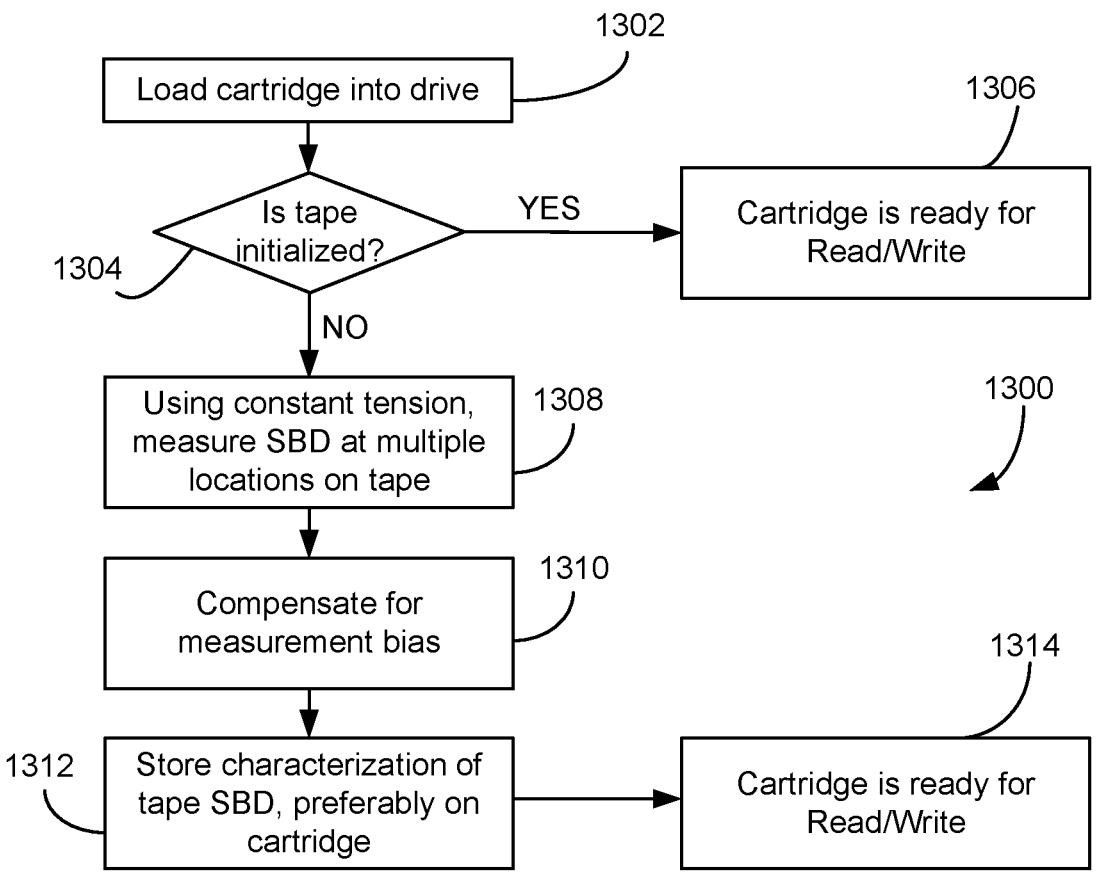
FIG. 13 is a flowchart of a process for characterizing a magnetic recording tape of a tape cartridge in one illustrative approach.

FIG. 13 is a flowchart of a method 1300 for characterizing a magnetic recording tape of a tape cartridge in one illustrative approach. The method 1300 may be performed in accordance with the present invention in any of the environments depicted in FIGS. 1-12, among others, in various approaches. Of course, more or less operations than those specifically described in FIG. 13 may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 13, method 1300 may initiate with operation 1302, where a cartridge is loaded into a tape drive. At decision 1304, a determination is made as to whether the tape has been initialized, e.g., using the method 1200 of FIG. 12, and SBD information is available for the tape. If so, the cartridge is deemed ready for read and/or write operations. See operation 1306. If SBD information is not available, the method 1300 proceeds with operation 1308 where the SBD is measured at multiple locations of the tape using about constant tension. In operation 1310, the measurements are compensated for any of a variety of parameters. For example, the measurements may be compensated due to measurement bias from the head dimensions, and namely the servo reader pitch. The compensation may also and/or alternatively have a temperature and/or humidity component. In operation 1312, the SBD information is stored, preferably in the CM of the cartridge, but may be in other locations such as on the media itself, in a removable memory coupled to the cartridge such as an SD card, etc. The cartridge is deemed ready for read and/or write operations. See operation 1314.

Figure 14:
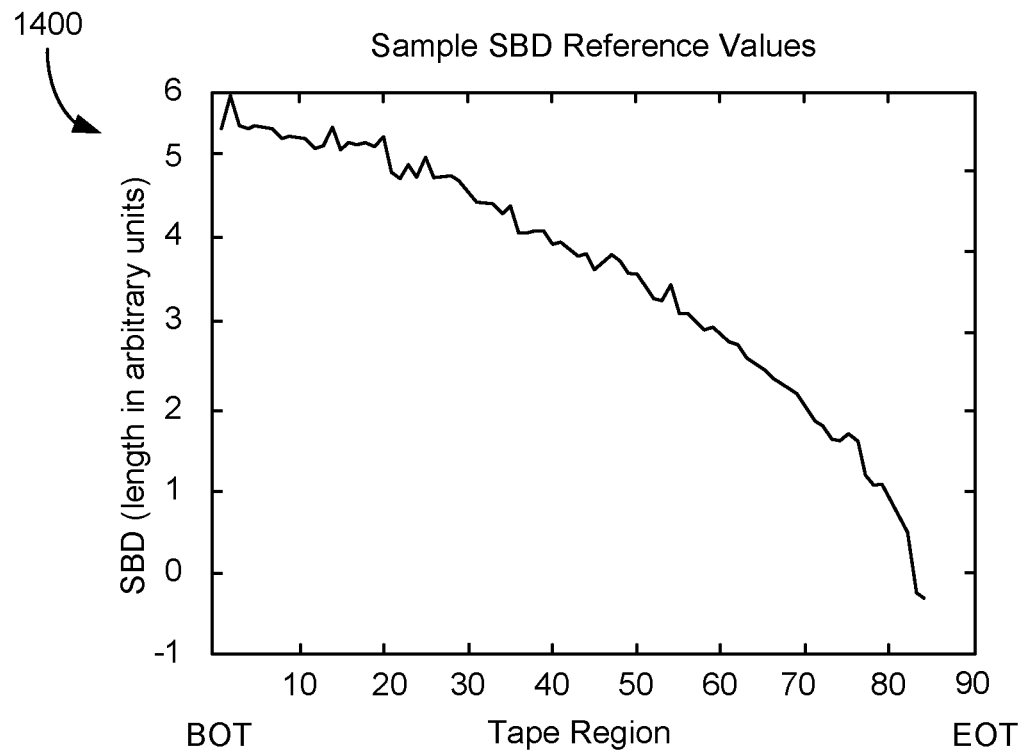
FIG. 14 illustrates exemplary sample SBD reference values from Beginning of Tape (BOT) to End of Tape (EOT) gathered during performance of the process of FIG. 12.

FIG. 14 is a chart 1400 that illustrates exemplary sample SBD reference values from BOT to EOT gathered during performance of the method 1200 of FIG. 12. As shown, the SBD measurements are highest at BOT and turn slightly negative by EOT. As noted above, where SBD is larger, this implies that the tape has contracted in the lateral direction in the time since the servo tracks were written. Likewise, where SBD gets smaller, this implies that the tape has expanded in the lateral direction.

The SBD information stored in association with the tape and its cartridge can then be used for other things, such as reading and writing.

During writing, the stored SBD information may be retrieved, e.g., from the CM, and loaded into the drive memory for use as reference values for the desired SBD for the current writing operation. Because most tape formats utilize shingling, the current tracks partially overwrite previously written tracks. The amount of shingling must be precisely controlled, or else too much of the previous track will be overwritten, and the data written to those previous tracks will become unreadable and the data irretrievably lost. As tape and head dimensional changes affect the location of written tracks, it is critical that the current writing operation does not excessively trim, or narrow, the previously written data.

Figure 15:
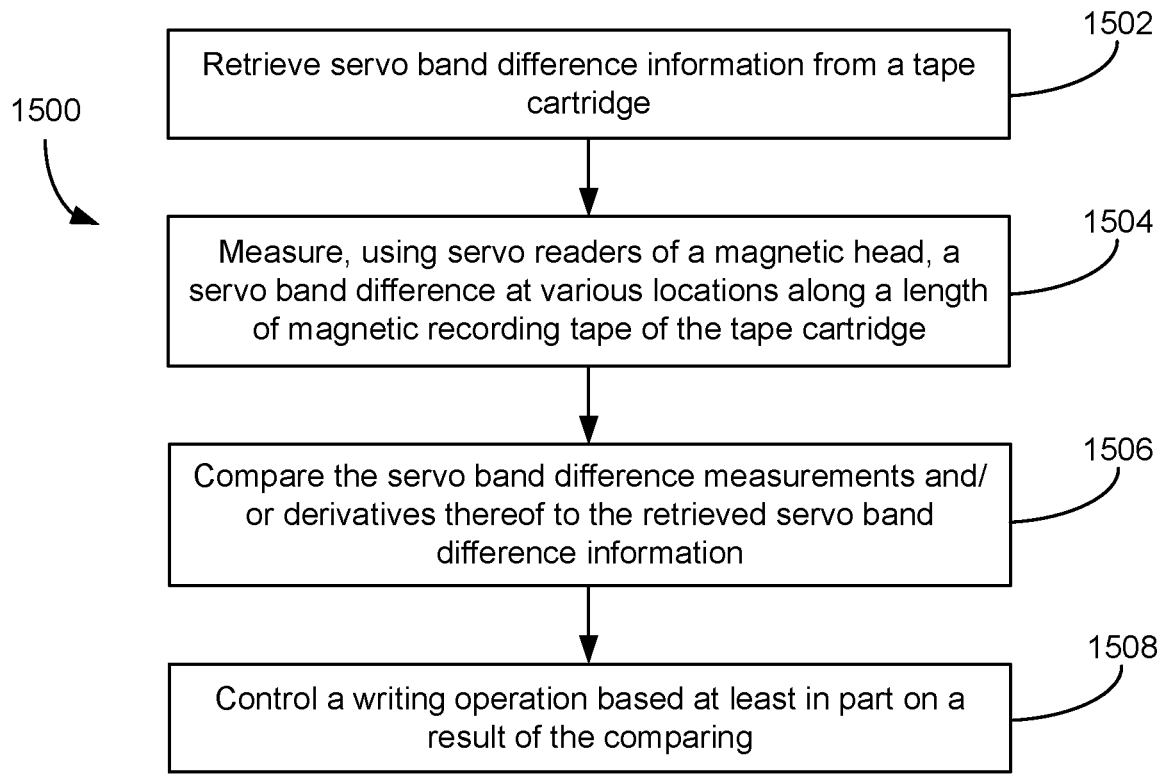
FIG. 15 is a flowchart of a process for controlling writing to a magnetic recording tape of a tape cartridge.

FIG. 15 is a flowchart of a method 1500 for controlling writing to a magnetic recording tape of a tape cartridge. The method 1500 may be performed in accordance with the present invention in any of the environments depicted in FIGS. 1-14, among others, in various approaches. Of course, more or less operations than those specifically described in FIG. 15 may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

The method 1500 may be performed in response to receiving a request to write to a tape of a tape cartridge. Conventional operations are typically performed in addition to the steps below, including loading the tape in the tape drive, mounting the tape, spooling the tape to the proper location for writing, processing index information about the data on the tape, etc.

Operation 1502 includes retrieving servo band difference information about the tape cartridge. Again, the servo band difference information may be retrieved from any source, such as CM of the cartridge, from the tape itself, from a remote database, etc.

Operation 1504 includes measuring, using servo readers of the magnetic head of the tape drive, a servo band difference at various locations along a length of a magnetic recording tape of the tape cartridge. For example, the servo band difference measurements may be taken as the tape is indexed to the writing position. In another approach, measurements may be taken at points along the entire tape or selected portion thereof, prior to writing. Preferably, at least some of the measuring is performed during the writing operation.

Operation 1506 includes comparing the servo band difference measurements and/or derivatives thereof to the retrieved SBD information (such as values in and/or derived from the SBD information). For example, a current measurement may be compared to the SBD value recorded in the CM.

Operation 1508 includes controlling a writing operation based at least in part on a result of the comparing. Any parameter associated with the writing operation may be controlled in operation 1508, such as suspending and/or canceling writing in response to a result of the comparing if operation 1506 being indicative of potential off-track writing; adjusting an operating condition of the tape drive for reducing occurrence of off-track writing such as by changing a width of the tape by adjusting tape tension and/or heating or cooling the tape, adjusting pitches between transducers of the magnetic head e.g., by inducing thermal expansion of the head using an integrated heating device, inducing expansion or contraction of the head using a piezo device, etc.; tilting the axis of the array of transducers away from perpendicular to the direction of tape travel; etc.

Where the comparison of operation 1508 is performed prior to writing, the writing operation may be suspended, e.g., not started, in response to a result of the comparing being indicative of potential off-track writing, and writing conditions may be adjusted in an attempt to improve the results of the comparison. If the result of the comparing is in a predefined range indicating that off-track writing is sure to occur, the entire writing operation may be canceled. If the result of the comparing indicates that only a portion of the tape is unsuitable for writing, writing may be performed in areas of the tape away from that portion.

Where the comparison is performed during writing, the writing operation may be suspended in response to a result of the comparing being indicative of potential (including actual) off-track writing.

In one approach, if the difference between the current SBD information and the stored SBD information is less than an amount which can be tolerated by the format being used, then writing is allowed to continue. If the difference is greater than this amount, then the writing is stopped to prevent overwriting of adjacent tracks. This is a similar situation as when writing is stopped for excessive Position Error Signal (PES) to prevent overwriting of adjacent tracks. If the SBD exceeds a threshold set for the particular format being used, then multiple options are available. One option is to simply stop writing, and if the stop writing distance is long enough, the write operation may cease with a permanent error. In various approaches, this error does cause the writing to stop, but it protects previously written data that would have otherwise been overwritten if not for the stop writing condition.

As noted above, another option to control the writing operation is to utilize a scheme to adjust the SBD, such as varying the tape tension. Note that any other technique to adjust the SBD can also and/or alternatively be utilized. In one approach, the tension is continuously adjusted regardless of SBD relative to the reference CM values. In another approach, the tension is only adjusted if the SBD exceeds a threshold from the reference values. A potential advantage of waiting to adjust tension until after SBD exceeds a threshold is that utilizing tension has some negative side effects, such as creating a tape pack that has a higher stress value. By delaying the use of tension until it is absolutely needed, the negative side effects can be deferred until necessary.

The SBD measurements created in operation 1504 and/or derivatives thereof are preferably stored on the tape cartridge, e.g., in a DSIT, in CM, and/or on tape.

In a preferred approach, for the measurements taken during writing (which may include and/or be measurements taken prior or subsequent to writing but after the tape is loaded and before it is subsequently unloaded, the actual measurements of SBD and/or derivatives thereof at the time of writing are recorded in the DSIT along with details about the data written on tape. This current SBD information is preferably stored regardless of the value written in the CM. The current SBD information recorded in the DSIT may be different from the SBD information written to the CM during cartridge initialization, as there will typically be some difference in SBD between the initial cartridge characterization and the actual writing of use data. It is important to note that the SBD measured during writing should not be modified by any known head parameters from VPD and/or temperature/humidity effects. While the earlier-stored head spacing values were useful during cartridge calibration to get accurate measurements of the cartridge into the CM, these values should not be recorded during writing, as the measurement of SBD during writing is a statement of the head and media condition at the time of writing. For example, if a "wide" head having a wider than ideal servo spacing were used during cartridge initialization, it would be desirable to remove the bias that the wide head has for the measurement. However, during the actual writing process, this wide head writes tracks in locations that are farther apart and the drive should take the appropriate action for this behavior. The CM holds the reference locations that an ideal writer would observe while writing, while the DSIT contains information about the actual conditions observed during writing.

Figure 16:
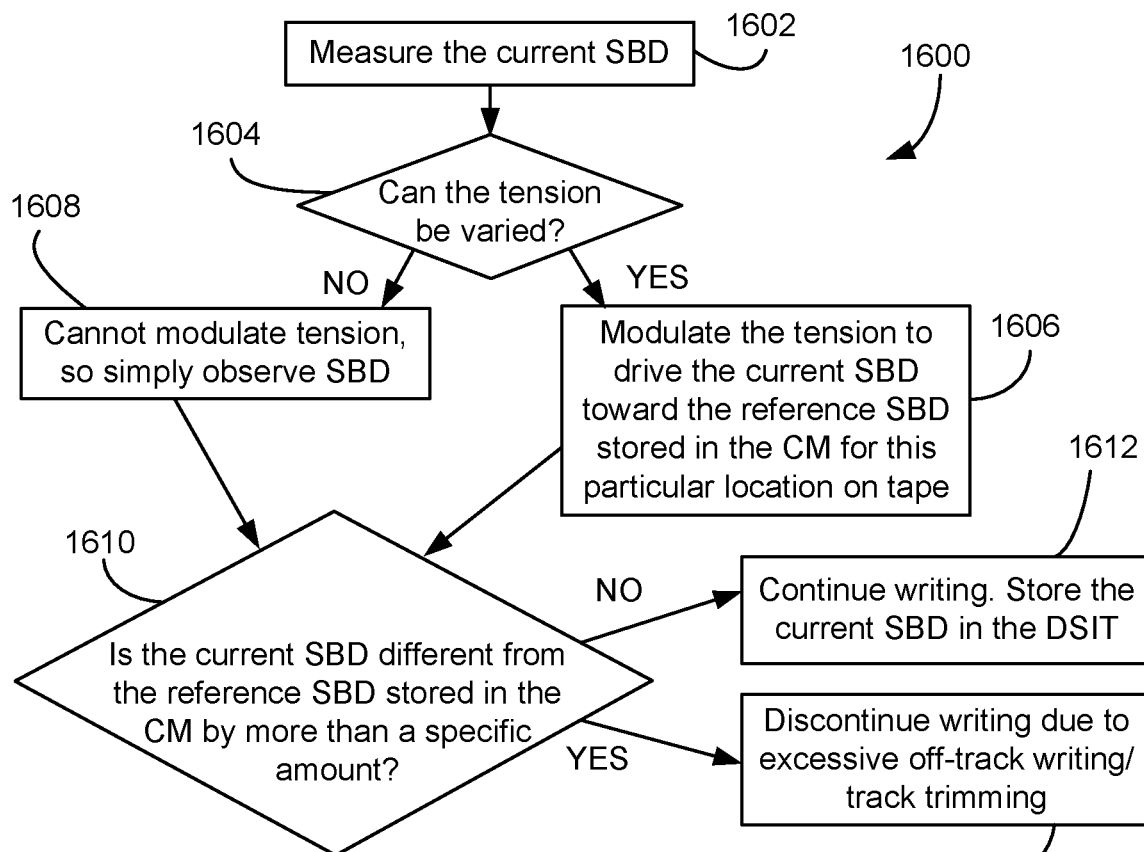
FIG. 16 is a flowchart of a process for one exemplary mode of use during writing.

FIG. 16 is a flowchart of a method 1600 for one exemplary mode of use. The method 1600 may be performed in accordance with the present invention in any of the environments depicted in FIGS. 1-15, among others, in various approaches. Of course, more or less operations than those specifically described in FIG. 16 may be included in method 1600, as would be understood by one of skill in the art upon reading the present descriptions.

Each of the steps of the method 1600 may be performed by any suitable component of the operating environment. For example, in various embodiments, the method 1600 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1600. Illustrative processors include, but are not limited to, a central processing unit (CPU), an application specific integrated circuit (ASIC), a field programmable gate array (FPGA), etc., combinations thereof, or any other suitable computing device known in the art.

In operation 1602, before and/or during writing, the current SBD is measured by the writing head. Decision 1604 indicates whether the tension can be varied. If the tension can be varied, the tension is modulated to drive the current SBD toward the reference SBD stored in the CM for this particular location on tape. See operation 1606. If the tension cannot be varied, the SBD is simply observed. See operation 1608. At decision 1610, a determination is made as to whether the current SBD is different from the reference SBD stored in the CM by more than a specific amount, e.g., a predefined amount that is indicative of potential off-track writing. If the current SBD is not different from the reference SBD by at least the specific amount, writing continues in operation 1612. The current SBD may also be stored in the DSIT. If the current SBD is different from the reference SBD by at least the specific amount, writing is discontinued in operation 1614 to prevent off-track writing and/or track trimming.

The present description will now turn to using SBD information during reading operations. During reading, the SBD information stored during writing, such as the values of SBD observed during writing, are read, e.g., from DSIT information. In order to achieve the best reading possible, it is desirable that all of the readers are centered above their respective tracks on tape. This is best achieved when the SBD observed during reading matches the value that was stored, e.g., in the DSIT during writing. When all of the readers are centered above their respective tracks on tape, error rates are lower, and less error correction processing, such as Error Correction Code (ECC) processing is needed. Therefore, the error processing capabilities can dedicate more resources to other operations such as dealing with electronic noise, media defects, and the like. The reading operation may be controlled for such things as suspending writing, modifying the SBD during reading in an attempt to match the SBD from the SBD information stored when the data was written, etc.

Figure 17:
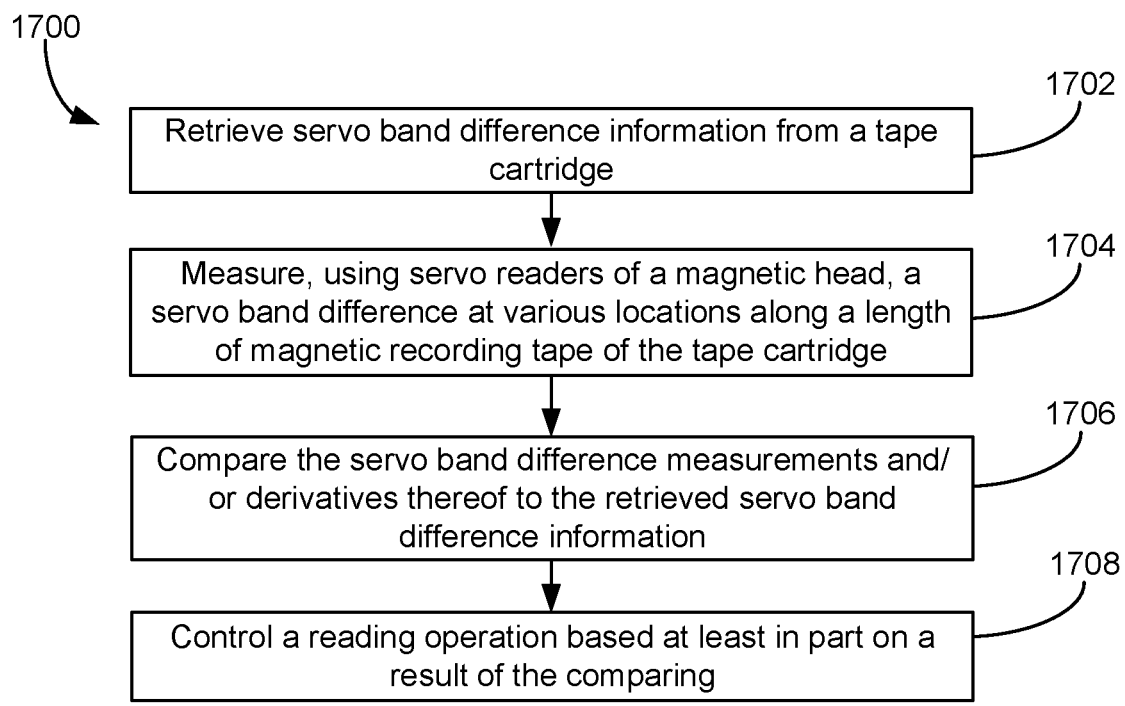
FIG. 17 is a flowchart of a process for controlling writing to a magnetic recording tape of a tape cartridge.

FIG. 17 is a flowchart of a method 1700 for controlling writing to a magnetic recording tape of a tape cartridge. The method 1700 may be performed in accordance with the present invention in any of the environments depicted in FIGS. 1-16, among others, in various approaches. Of course, more or less operations than those specifically described in FIG. 17 may be included in method 1700, as would be understood by one of skill in the art upon reading the present descriptions.

Each of the steps of the method 1700 may be performed by any suitable component of the operating environment. For example, in various embodiments, the method 1700 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1700. Illustrative processors include, but are not limited to, a central processing unit (CPU), an application specific integrated circuit (ASIC), a field programmable gate array (FPGA), etc., combinations thereof, or any other suitable computing device known in the art.

The method 1700 may be performed in response to receiving a request to read from a tape of a tape cartridge. Conventional operations are typically performed in addition to the steps below, including loading the tape in the tape drive, mounting the tape, processing index information about the data on the tape, spooling the tape to the proper location for reading, etc.

Operation 1702 includes retrieving servo band difference information about the tape cartridge. Again, the SBD information may be retrieved from any source, such as CM of the cartridge, from the tape itself, from a remote database, etc. Here, the retrieved SBD information is preferably indicative of a condition of the magnetic recording tape contemporaneously with the writing of the data to be read, i.e., as measured at some period between loading for the writing operation and subsequently unloading the tape cartridge. For example, SBD information gathered before (or equivalently, after) writing the data may be retrieved, so that the writing operation can be controlled if needed.

Operation 1704 includes measuring, using servo readers of the magnetic head of the tape drive that will perform the reading operation, a servo band difference at various locations along a length of a magnetic recording tape of the tape cartridge. For example, the servo band difference measurements may be taken as the tape is indexed to the reading position. In another approach, measurements may be taken at points along the entire tape or selected portion thereof, prior to reading. Preferably, at least some of the measuring is performed during the reading operation.

Operation 1706 includes comparing the SBD measurements and/or derivatives thereof to the retrieved SBD information (such as values in and/or derived from the retrieved SBD information). For example, the current measurement may be compared to the SBD information recorded in the DSIT when the data to be read was written to the tape.

Operation 1708 includes controlling a reading operation based at least in part on a result of the comparing. Any parameter associated with the reading operation may be controlled in operation 1708, such as suspending and/or canceling reading in response to a result of the comparing if operation 1706 being indicative of potential off-track reading; performing error recovery in response to a result of the comparing if operation 1706 being indicative of potential off-track reading; adjusting an operating condition of the tape drive for reducing occurrence of off-track reading such as by changing a width of the tape by adjusting tape tension and/or heating or cooling the tape, adjusting pitches between transducers of the magnetic head e.g., by inducing thermal expansion of the head using an integrated heating device, etc.; etc.

As noted above, tension or other technique may be used to modify the SBD during reading to match the SBD written in the DSIT. However, if it is desired not to change the stress of the packed tape, then it may be desirable to not modify the tension, which could result in permanent read errors. If a large difference is observed between the current SBD and the SBD recorded in the DSIT, temporary error recovery may be performed, such as increasing the tension range (or utilization of tension modulation, even if the initial setting was to leave tension fixed). Typically, an error recovery operation is preferable to an error condition. However, other drives that have different reader head spacing values (pitch), or other temperature and/or humidity conditions, may also change the apparent spacing during read which may more closely align the readers with their respective tracks.

Figure 18:
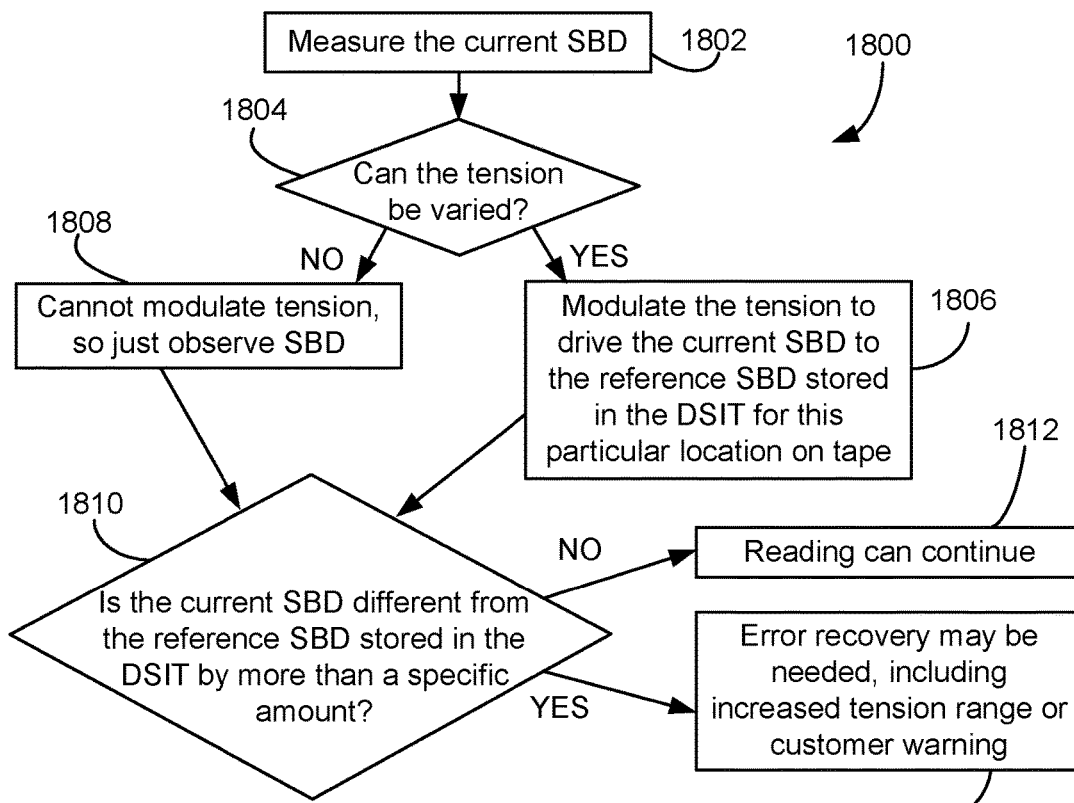
FIG. 18 is a flowchart of a process for one exemplary mode of use during reading.

FIG. 18 is a flowchart of a method 1800 for one exemplary mode of use. The method 1800 may be performed in accordance with the present invention in any of the environments depicted in FIGS. 1-17, among others, in various approaches. Of course, more or less operations than those specifically described in FIG. 18 may be included in method 1800, as would be understood by one of skill in the art upon reading the present descriptions.

Each of the steps of the method 1800 may be performed by any suitable component of the operating environment. For example, in various embodiments, the method 1800 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1800. Illustrative processors include, but are not limited to, a central processing unit (CPU), an application specific integrated circuit (ASIC), a field programmable gate array (FPGA), etc., combinations thereof, or any other suitable computing device known in the art.

In operation 1802, before and/or during reading, the current SBD is measured by the reading head. Decision 1804 determines whether the tension can be varied. If the tension can be varied, the tension is modulated to drive the current SBD toward the reference SBD stored in the DSIT for this particular location on tape. See operation 1806. If the tension cannot be varied, the SBD is simply observed. See operation 1808. At decision 1810, a determination is made as to whether the current SBD is different from the reference SBD stored in the DSIT by more than a specific amount, e.g., a predefined amount that is indicative of potential off-track reading. If the current SBD is not different from the reference SBD by at least the specific amount, reading continues in operation 1812. If the current SBD is different from the reference SBD by at least the specific amount, remedial measures are taken in operation 1814, such as performing error recovery, such as increasing a tension range, etc. A customer warning may also, or alternatively, be output.

In addition to generation and use of SBD data as described in detail above, one further advantage is that SBD information, e.g., stored in the CM during cartridge initialization, may be used as reference values to measure the amount of creep that a tape cartridge has experienced. For example, assume that data is stored on a tape of a tape cartridge, and then a user wanted to know five years later what the condition of the tape is in terms of the extent of creep, the tape may be loaded into a drive and the SBD measured from BOT to EOT or some length therebetween, e.g., in a motion similar to the initial cartridge initialization. Even if this verification is performed on a different drive than the drive used for initialization of this particular tape cartridge, because both drives have their respective head spacing values, the current measurements can be compensated. Additionally, temperature and/or humidity compensations may also be applied to more closely approximate the tape spacing condition in the nominal situation. What remains is a comparison of the tape condition at initialization to the present condition without the influence of the initializing head or the verifying head, and/or other environmental variations. It may be desired to quantify the amount of creep, the amount of environmental difference, or a combination of both, that has occurred since tape initialization. By recording initial SBD measurements, along with initial head spans, temperature, and humidity, these differences can be obtained. This ability to quantify creep or other changes is a useful feature for large tape library installations where it is desired to periodically measure tapes to ensure that their creep rates are as expected. Determinations may also be made to detect whether specific tapes have crept more than a desired amount, and these tapes can be marked for copying to alternate tapes before excessive creep renders these tapes unreadable. After copying the data to alternate tapes, these high creep tapes may be reinitialized/reformatted, which resets the reference values in the CM and renders any aging/creep that happened previously as irrelevant.

Figure 19:
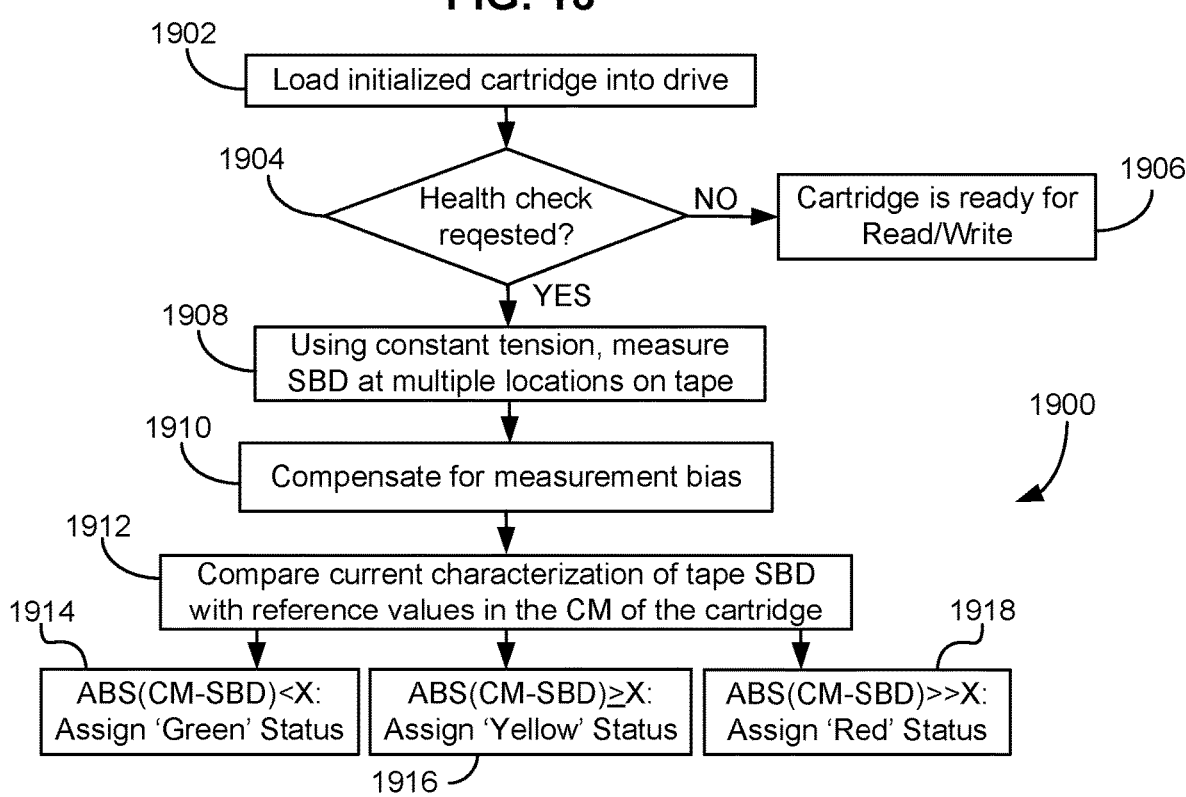
FIG. 19 is a flowchart of a process for characterizing the present state of a tape of a tape cartridge relative to an earlier state thereof.

FIG. 19 is a flowchart of a method 1900 for characterizing the present state of a tape of a tape cartridge relative to an earlier state thereof. This process 1900 enables determination of the effects of aging of the tape, the present effect of environmental conditions on the tape, etc. The method 1900 may be performed in accordance with the present invention in any of the environments depicted in FIGS. 1-18, among others, in various approaches. Of course, more or less operations than those specifically described in FIG. 19 may be included in method 1900, as would be understood by one of skill in the art upon reading the present descriptions.

Each of the steps of the method 1900 may be performed by any suitable component of the operating environment. For example, in various embodiments, the method 1900 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1900. Illustrative processors include, but are not limited to, a central processing unit (CPU), an application specific integrated circuit (ASIC), a field programmable gate array (FPGA), etc., combinations thereof, or any other suitable computing device known in the art.

The method 1900 may be performed in response to receiving a request to read from and/or write to a tape of a tape cartridge. The request may include a health check. The method 1900 allows the drive, library and/or user to determine whether the read and/or operation will be successful, or may result in excessive overwriting and/or read errors due misregistration between the transducers and data tracks. In another approach, the method 1900 may be performed in response to receiving a request to simply perform a health check. In yet another approach, several of the operations of the method 1900 may be performed automatically without receiving a request for a health check, e.g., in response to determining that the tape has not been written to in more than a predetermined amount of time, the detection of errors when reading, etc.

Conventional operations are typically performed in addition to the steps below, including loading the tape in the tape drive, mounting the tape, processing index information about the data on the tape, etc.

Operation 1902 includes loading an initialized cartridge into a drive. Decision 1904 determines whether a health check has been requested for this cartridge. If not, the cartridge is deemed ready for read and/or write operations. See operation 1906. If a health check has been requested, the SBD is measured at multiple locations along tape using constant tension in operation 1908. Preferably, the tension is about the same as the tension used during initialization. In operation 1910, the measurements are compensated for any of a variety of parameters. For example, the measurements may be compensated for the actual head dimensions, as determined using the drive information. Depending on the type of health check desired, it may be advantageous to also compensate for temperature and/or humidity. In operation 1912, the current characterization of tape SBD is compared with the reference values in the CM of the cartridge that were created during initialization. The effects of aging, such as the extent of creep, may be characterized based on the comparisons, which are preferably done for each SBD measurement, but may be performed for a subset thereof.

Any type of indication or value for such characterization may be used. An alert may be output to indicate such things as that the comparison indicates the potential for data loss and the user should consider migrating, or should migrate, the data.

In the example shown, if the absolute value of the difference between the reference value in the CM and the current SBD measurement is in a range, such as below a value X, then the creep may be characterized as minimal (e.g., Green Status). See operation 1914. If the absolute value of the difference between the reference value in the CM and the current SBD measurement is in another range, such as above a value X, then the creep may be characterized as potentially affecting read/write operations (e.g., Yellow Status). See operation 1916. If the absolute value of the difference between the reference value in the CM and the current SBD measurement is in a third range, such as above a value X by a predefined amount, then the creep may be characterized as extremely likely to affect read/write operations (e.g., Red Status). See operation 1918. Actions such as those mentioned above may be taken based on the Status.

This process 1900 enables, among other things, characterization of the aging of a tape so that remedial measures may be taken if desired, thereby minimizing the likelihood of data loss. For example, if the cartridge is assigned a Red Status, the data may be moved to a different cartridge. Once the data is moved and the tape can be erased, the cartridge can be re-initialized and used as normal. The creep no longer is considered an issue because the tape is characterized in its present state.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for characterizing a magnetic recording tape, the method comprising:
   measuring, using a magnetic head having two servo readers of known pitch, a servo band difference at various locations along a length of a magnetic recording tape wherein each servo band difference measurement is based on position measurements of both servo readers; and
   storing the servo band difference measurements and/or derivatives thereof in association with the magnetic recording tape.

2. A method as recited in claim 1, wherein the servo band difference measurements are taken at the various locations along about an entire length of the magnetic recording tape.

3. A method as recited in claim 1, wherein at least 100 of the servo band difference measurements are taken.

4. A method as recited in claim 1, comprising maintaining the magnetic recording tape at about constant tension while measuring the servo band differences.

5. A method as recited in claim 1, wherein the servo band difference measurements and/or derivatives thereof are stored on the magnetic recording tape and/or a tape cartridge thereof.

6. A method as recited in claim 1, wherein the known pitch is particular to a tape drive having the magnetic head, wherein the servo band difference measurements and/or derivatives thereof are compensated using the known pitch.

7. An apparatus, comprising:
   a drive mechanism for passing the magnetic recording tape over the magnetic head; and
   a controller electrically coupled to the magnetic head, the controller being configured to perform the method of claim 1.

8. A computer program product for characterizing a magnetic recording tape, the computer program product comprising a computer readable storage medium having program instructions embodied therewith, wherein the computer readable storage medium is not a transitory signal per se, the program instructions executable by a tape drive having the magnetic head to cause the tape drive to perform the method of claim 1.

9. A method for controlling writing to a magnetic recording tape, the method comprising:
   retrieving servo band difference information about a magnetic recording tape;
   measuring, using servo readers of a magnetic head, a servo band difference at various locations along a length of the magnetic recording tape;
   comparing the servo band difference measurements and/or derivatives thereof to the retrieved servo band difference information; and
   controlling a writing operation based at least in part on a result of the comparing.

10. A method as recited in claim 9, wherein the measuring and comparing are performed during the writing operation, wherein the writing operation is suspended in response to a result of the comparing being indicative of potential off-track writing.

11. A method as recited in claim 9, wherein the measuring and comparing are performed during the writing operation, and comprising adjusting an operating condition in response to the comparing for reducing occurrence of off-track writing.

12. A method as recited in claim 11, wherein adjusting the operating condition includes adjusting a tape tension during the writing.

13. A method as recited in claim 11, wherein adjusting the operating condition includes adjusting pitches between transducers of the magnetic head during the writing.

14. A method as recited in claim 9, wherein the measuring and comparing are performed before the writing operation, wherein the writing operation is suspended in response to a result of the comparing being indicative of potential off-track writing.

15. A method as recited in claim 9, wherein the measuring is performed during the writing operation, and comprising storing the servo band difference measurements and/or derivatives thereof on the magnetic recording tape and/or a tape cartridge thereof.

16. An apparatus, comprising:
   a drive mechanism for passing the magnetic recording tape over the magnetic head; and
   a controller electrically coupled to the magnetic head, the controller being configured to perform the method of claim 9.

17. A computer program product for characterizing a magnetic recording tape, the computer program product comprising a computer readable storage medium having program instructions embodied therewith, wherein the computer readable storage medium is not a transitory signal per se, the program instructions executable by a tape drive having the magnetic head to cause the tape drive to perform the method of claim 9.

18. A method for controlling reading of a magnetic recording tape, the method comprising:
   retrieving servo band difference information about a magnetic recording tape;
   measuring, using servo readers of a magnetic head, a servo band difference at various locations along a length of the magnetic recording tape;
   comparing the servo band difference measurements and/or derivatives thereof to the retrieved servo band difference information; and
   controlling a reading operation based at least in part on a result of the comparing.

19. A method as recited in claim 18, wherein the measuring and comparing are performed during the reading operation, and comprising adjusting an operating condition in response to the comparing for reducing occurrence of off-track reading.

20. A method as recited in claim 19, wherein adjusting the operating condition includes adjusting a tape tension during the reading.

21. A method as recited in claim 19, wherein adjusting the operating condition includes adjusting pitches between transducers of the magnetic head during the reading.

22. A method as recited in claim 19, wherein adjusting the operating condition includes performing error recovery in response to a result of the comparing being indicative of off-track reading.

23. A method as recited in claim 18, wherein the servo band difference information is indicative of a condition of the magnetic recording tape when the data currently being read was written.

24. A method as recited in claim 18, wherein the servo band difference information is indicative of a condition of the magnetic recording tape before the data currently being read was written.

25. An apparatus, comprising:
   a drive mechanism for passing the magnetic recording tape over the magnetic head; and
   a controller electrically coupled to the magnetic head, the controller being configured to perform the method of claim 18.

* * * * *